US012807008B2

(12) United States Patent
Kurtz et al.

(10) Patent No.: US 12,807,008 B2
(45) Date of Patent: Nov. 24, 2026

(54) SYSTEMS AND METHODS FOR COORDINATING E-TRAILER PROPULSION

(71) Applicants: Hyundai Motor Company, Seoul (KR); Kia Corporation, Seoul (KR)

(72) Inventors: Eric Kurtz, Superior Township, MI (US); Shengrong Zhu, Superior Township, MI (US); Da Chang, Superior Township, MI (US); Mark Shirley, Superior Township, MI (US); Kyoung Pyo Ha, Superior Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 21 days.

(21) Appl. No.: 18/978,135

(22) Filed: Dec. 12, 2024

(65) Prior Publication Data

US 2026/0167019 A1 Jun. 18, 2026

(51) Int. Cl.
*B60L 15/38* (2006.01)

(52) U.S. Cl.
CPC ........... *B60L 15/38* (2013.01); *B60L 2240/26* (2013.01); *B60L 2240/441* (2013.01); *B60L 2240/445* (2013.01); *B60L 2240/547* (2013.01)

(58) Field of Classification Search
None
See application file for complete search history.

(56) References Cited

U.S. PATENT DOCUMENTS

2022/0266866 A1* 8/2022 Ruiz ........................ B60D 1/36
2023/0226866 A1* 7/2023 Diamond ................ B60D 1/62
701/22
2024/0402253 A1* 12/2024 Pereira .................... H03M 1/66

FOREIGN PATENT DOCUMENTS

DE 102019211753 A1 * 2/2021 ............ B60D 1/248
DE 10 2019 217 707 A1 5/2021
WO 2023/183974 A1 10/2023

* cited by examiner

*Primary Examiner* — Shayne M. Gilbertson
(74) *Attorney, Agent, or Firm* — Fox Rothschild LLP

(57) ABSTRACT

Systems and methods for coordinating propulsion of an e-trailer are provided. The system may comprise the e-trailer. The e-trailer may comprise a battery, a motor configured to propel the e-trailer, and a trailer controller, comprising a processor and a memory. The system may comprise a tow vehicle coupled to the e-trailer and configured to pull the e-trailer, and a sensor configured to determine one or more of a force exerted from the tow vehicle to the e-trailer and a force exerted from the e-trailer to the tow vehicle. The trailer controller may be configured to determine one or more data points associated with the tow vehicle, and adjust a propulsion of the e-trailer, using the motor, based on the one or more data points.

18 Claims, 10 Drawing Sheets

SYSTEMS AND METHODS FOR COORDINATING E-TRAILER PROPULSION

BACKGROUND

Technical Field

Embodiments of the present disclosure relate to systems and methods for coordinating the propulsion of e-trailers.

Background

Electricity-powered trailers (or e-trailers) are electricity-powered trailers configured to be towed by a vehicle. The tow vehicle may be an electric vehicle (EV), a vehicle powered by an internal combustion engine (ICE), and/or other suitable vehicle.

When conventional methods are used to control the e-trailer, the vehicle towing the e-trailer may run out of battery charge before the e-trailer or vice versa. This could be caused by a number of reasons. For example, the state of charge of at least one of the vehicle or the e-trailer being lower at the beginning of a trip, the weight of the e-trailer being relatively low or high, additional weight being in the vehicle, and/or other reasons.

Some e-trailers may comprise a motor configured to drive the e-trailer. The motor may be battery powered. However, when all of the energy required to drive the e-trailer comes from the e-trailer battery, the e-trailer battery size may exceed that of the vehicle, leading to an extended charge time for the e-trailer which would cause the customer to have to wait a longer time for the e-trailer to charge and/or increase the likelihood that the trailer would run out of energy before the vehicle.

When the tow vehicle has an ICE, the fuel efficiency, emissions, and/or performance can be degraded during towing for numerous reasons. These may include that the engine operates in a less efficient regime, that the exhaust temperature is sufficiently high that the engine goes into enrichment (for a gasoline ICE), that the exhaust temperature is sufficiently high that the catalyst is not effective (for a diesel ICE), that the exhaust temperature is sufficiently low that the catalyst is not effective (for a gas or diesel ICE), and/or that the water, oil, or fuel temperature exceed a limit due to high load operation.

For at least these reasons, systems and methods are needed for maximizing the range when towing with an EV in the face of differences in tow vehicle and loading that will affect drag and mass as well as starting state of charge (SOC) and, when towing with an ICE-powered vehicle, that control e-trailer propulsion to avoid the issues discussed above to improve fuel efficiency, emissions, and performance.

SUMMARY

According to an object of the present disclosure, a system for coordinating propulsion of an e-trailer is provided. The system may comprise the e-trailer. The e-trailer may comprise a battery, a motor configured to propel the e-trailer, and a trailer controller, comprising a processor and a memory. The system may comprise a tow vehicle coupled to the e-trailer and configured to pull the e-trailer, and a sensor configured to determine one or more of a force exerted from the tow vehicle to the e-trailer and a force exerted from the e-trailer to the tow vehicle. The trailer controller may be configured to determine one or more data points associated with the e-trailer and the tow vehicle, and adjust a propulsion of the e-trailer, using the motor, based on the one or more data points.

According to an exemplary embodiment, the one or more data points may comprise a vehicle type of the tow vehicle.

According to an exemplary embodiment, the vehicle type may comprise one of the following: an electric vehicle (EV) comprising a battery; an internal combustion engine (ICE)-powered vehicle comprising an ICE; and a hybrid EV (HEV) comprising a battery and an ICE.

According to an exemplary embodiment, the vehicle type may be an EV, and the one or more data points may comprise one or more of the following: a state of charge (SOC) of the battery of the EV; an estimated electric range of the EV; a total drag estimate of the EV; a total drag estimate of the e-trailer; a weight estimate of the EV; a weight estimate of the e-trailer; an SOC of the e-trailer; and an estimated electric range of the e-trailer.

According to an exemplary embodiment, the vehicle type may be an ICE-powered vehicle, and the one or more data points comprise one or more of the following: an exhaust temperature; an engine speed and load; a water temperature; an oil temperature; a fuel temperature; an engine operating mode; a total drag estimate of the ICE-powered vehicle; a total drag estimate of the e-trailer; a weight estimate of the ICE-powered vehicle; a weight estimate of the e-trailer; an SOC of the e-trailer; and an estimated electric range of the e-trailer.

According to an exemplary embodiment, the vehicle type may be an HEV, and the one or more data points comprise one or more of the following: an SOC of the battery of the HEV; an estimated electric range of the HEV; an exhaust temperature; an engine speed and load; a water temperature; an oil temperature; a fuel temperature; an engine operating mode; a total drag estimate of the HEV; a total drag estimate of the e-trailer; a weight estimate of the HEV; a weight estimate of the e-trailer; an SOC of the e-trailer; and an estimated electric range of the e-trailer.

According to an exemplary embodiment, the sensor may be configured to record the one or more data points.

According to an exemplary embodiment, the tow vehicle may comprise a tow vehicle controller, comprising a processor and a memory.

According to an exemplary embodiment, the tow vehicle controller may be configured to send one or more signals comprising the one or more data points.

According to an exemplary embodiment, the adjusting the propulsion of the e-trailer may comprise one or more of the following: increasing or decreasing a towing tension force between the e-trailer and the tow vehicle; increasing or decreasing a compression towing force; increasing or decreasing a towing force; and increasing or decreasing e-trailer motor power.

According to an object of the present disclosure, a method for coordinating propulsion of an e-trailer is provided. The method may comprise determining, using a sensor, a force exerted from a tow vehicle to the e-trailer, and a force exerted from the e-trailer to the tow vehicle. The e-trailer may comprise a battery, a motor configured to propel the e-trailer, and a trailer controller comprising a processor and a memory. The tow vehicle may be coupled to the e-trailer and configured to pull the e-trailer. The method may comprise determining, using the trailer controller, one or more data points associated with the e-trailer and the tow vehicle, and adjusting, using the trailer controller, a propulsion of the e-trailer, using the motor, based on the one or more data points.

According to an exemplary embodiment, the one or more data points may comprise a vehicle type of the tow vehicle.

According to an exemplary embodiment, the vehicle type may comprise one or more of the following: an EV comprising a battery; an ICE-powered vehicle comprising an ICE; and an HEV comprising a battery and an ICE.

According to an exemplary embodiment, the vehicle type may be an EV, and the one or more data points may comprise one or more of the following: an SOC of the battery of the EV; an estimated electric range of the EV; a total drag estimate of the EV; a total drag estimate of the e-trailer; a weight estimate of the EV; a weight estimate of the e-trailer; an SOC of the e-trailer; and an estimated electric range of the e-trailer.

According to an exemplary embodiment, the vehicle type may be an ICE-powered vehicle, and the one or more data points may comprise one or more of the following: an exhaust temperature; an engine speed and load; a water temperature; an oil temperature; a fuel temperature; an engine operating mode; a total drag estimate of the ICE-powered vehicle; a total drag estimate of the e-trailer; a weight estimate of the ICE-powered vehicle; a weight estimate of the e-trailer; an SOC of the e-trailer; and an estimated electric range of the e-trailer.

According to an exemplary embodiment, the vehicle type may be an HEV, and the one or more data points may comprise one or more of the following: an SOC of the battery of the HEV; an estimated electric range of the HEV; an exhaust temperature; an engine speed and load; a water temperature; an oil temperature; a fuel temperature; an engine operating mode; a total drag estimate of the HEV; a total drag estimate of the e-trailer; a weight estimate of the HEV; a weight estimate of the e-trailer; an SOC of the e-trailer; and an estimated electric range of the e-trailer.

According to an exemplary embodiment, the method may comprise recording, using the sensor, the one or more data points.

According to an exemplary embodiment, the tow vehicle may comprise a tow vehicle controller, comprising a processor and a memory.

According to an exemplary embodiment, the method may comprise sending, using the tow vehicle controller, one or more signals comprising the one or more data points.

According to an exemplary embodiment, the adjusting the propulsion of the e-trailer may comprise one or more of the following: increasing or decreasing a towing tension force between the e-trailer and the tow vehicle; increasing or decreasing a compression towing force; increasing or decreasing a towing force; and increasing or decreasing e-trailer motor power.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various FIGURES unless otherwise specified.

DETAILED DESCRIPTION

Figure 1A:
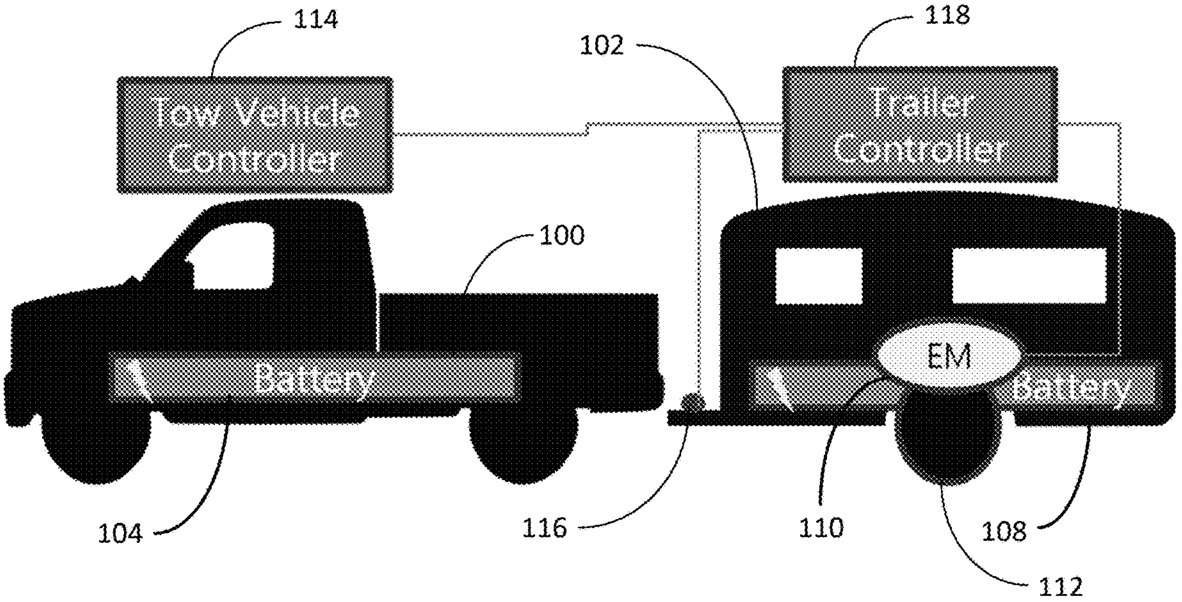
FIG. 1A illustrates an electric tow vehicle towing an electricity-powered trailer (e-trailer), according to an exemplary embodiment of the present disclosure.

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In aspects, a vehicle may comprise an internal combustion engine system as disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the FIGURES, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

According to exemplary embodiments, systems and methods for coordinating the propulsion of electricity-powered trailers (e-trailers) are provided. Controlling an electric self-propelled trailer according to the present disclosure aids in maximizing range, maintaining low emissions on an internal combustion engine (ICE) tow vehicle, enhancing performance on an ICE vehicle relative to towing a trailer, and ensuring that the charge times for the e-trailer and vehicle are similar.

Figure 1B:
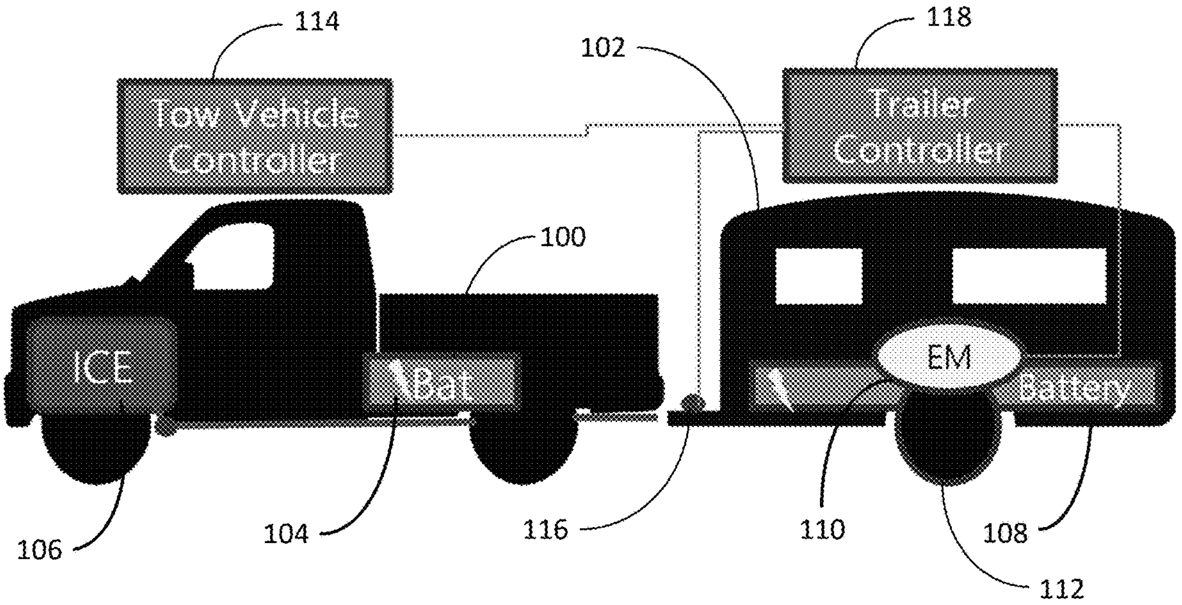
FIG. 1B illustrates a hybrid electric vehicle (HEV) tow vehicle towing an e-trailer, according to an exemplary embodiment of the present disclosure.
Figure 1C:
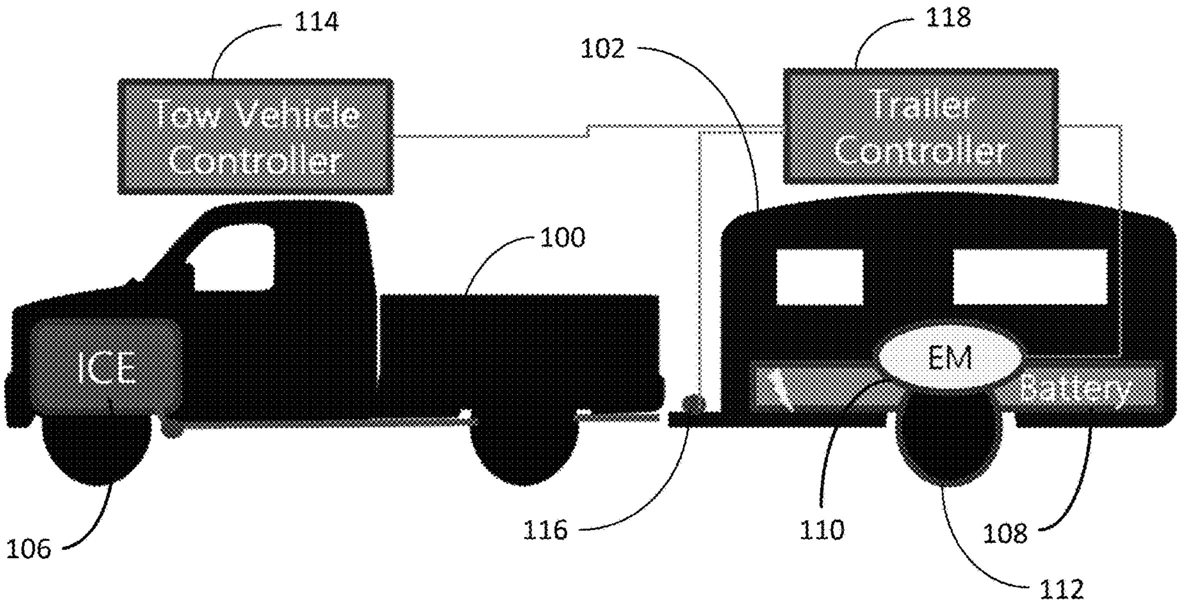
FIG. 1C illustrates an internal combustion engine (ICE)-powered tow vehicle towing an e-trailer, according to an exemplary embodiment of the present disclosure.

Referring now to FIGS. 1A-1C, tow vehicles 100 towing e-trailers 102 are illustratively depicted, in accordance with exemplary embodiments of the present disclosure. According to an exemplary embodiment, the tow vehicle 100 and the e-trailer 102 may form a system for coordinating the propulsion of the e-trailer 102.

The tow vehicle 100 may comprise an electric vehicle (EV) (as shown in FIG. 1A) comprising a battery 104, a hybrid EV (HEV) (as shown in FIG. 1B) comprising a battery 104 and an internal combustion engine (ICE) 106, or an ICE-powered vehicle (as shown in FIG. 1C) comprising an ICE 106. It is noted, however, that other suitable tow vehicles 100 may be incorporated while maintaining the spirit and functionality of the present disclosure. According to an exemplary embodiment, the ICE 106 may be configured to run on gasoline, diesel, and/or other suitable fuel.

According to an exemplary embodiment, the e-trailer 102 may comprise a battery 108. According to an exemplary embodiment, the size of the battery 108 in the e-trailer 102 may be equal to or less than the size of the battery 104 on the tow vehicle 100 (e.g., the battery 104 in the EV of FIG. 1A and HEV of FIG. 1B). This may prevent different charge times for the batteries 104 and 108 since the battery 104 of the tow vehicle 100 would be greater than or equal to the battery 108 of the e-trailer 102.

According to an exemplary embodiment, the e-trailer 102 may comprise at least one motor 110. The at least one motor 110 may be configured to propel the e-trailer 102. The e-trailer 102 may comprise one or more wheels 112 and the at least one motor 110 may be configured to drive the one or more wheels 112.

According to an exemplary embodiment, the e-trailer 102 may comprise a trailer controller 114. The trailer controller 114 may comprise a computing device. The computing device may comprise one or more processors, memory, graphical user interfaces, power sources, and/or other suitable components. According to an exemplary embodiment, the trailer controller 114 may be configured to control one or more functions of the e-trailer 102.

According to an exemplary embodiment, a sensor 116 may be positioned between the e-trailer 102 and the tow vehicle 100. The sensor 116 may be configured to determine a force ($F_T$) exerted from the tow vehicle 100 to the e-trailer 102 or vice versa. According to an exemplary embodiment, the sensor 116 may be coupled to the trailer controller 114 via wired and/or wireless connection.

According to an exemplary embodiment, the tow vehicle 100 may comprise a tow vehicle controller 118. The tow vehicle controller 118 may comprise a computing device. The computing device may comprise one or more processors, memory, graphical user interfaces, power sources, and/or other suitable components. According to an exemplary embodiment, the tow vehicle controller 118 may be configured to control one or more functions of the tow vehicle 100. According to an exemplary embodiment, the sensor 116 may be coupled to the tow vehicle controller 118 via wired and/or wireless connection.

According to an exemplary embodiment, the sensor 116 may be configured to sense, record, and/or send, from the tow vehicle controller 118 to the trailer controller 114 one or more data points. The one or more data points may describe and/or be indicative of a tow vehicle 100 type (e.g., EV, HEV, ICE, etc.), a tow vehicle 100 state of charge (SOC) (e.g., for an EV or HEV), an estimated tow vehicle 100 electric range (e.g., for an EV or HEV), an exhaust temperature (e.g., for ICE or HEV), an engine speed and load (e.g., for ICE or HEV), a water temperature (e.g., for an ICE or HEV), an oil temperature (e.g., for an ICE or HEV), a fuel temperature (e.g., for an ICE or HEV), an engine operating mode (e.g., for an ICE or HEV), a tow vehicle 100 total drag estimate, an e-trailer 102 total drag estimate, a tow vehicle 100 weight estimate, an e-trailer 102 weight estimate, and/or other suitable data points. According to an exemplary embodiment, one or more of the data points (e.g., the tow vehicle type 100) may be configured to be input by a user. According to an exemplary embodiment, the one or more data points may comprise one or more data points pertaining to the e-trailer 102. The one or more data points pertaining to the e-trailer 102 may comprise the SOC of the e-trailer 102, an estimated range of the e-trailer 102, and/or other suitable data points.

According to an exemplary embodiment, the trailer controller 114 and/or the tow vehicle controller 118 may be configured to determine an amount of power and/or torque to provide by the e-trailer motor 110. This amount of power may be determined via programmed control logic.

According to an exemplary embodiment, the goal of the control logic may depend on the tow vehicle 100 type (e.g., EV, gasoline ICE, diesel ICE, HEV, etc.). According to an exemplary embodiment, for an EV tow vehicle 100, the control logic may be responsive to one or more of the following: the available SOC of the battery 108 of the e-trailer 102, the e-trailer's 102 estimated weight and drag, the available SOC of the battery 104 of the tow vehicle 100, and the tow vehicle's estimated weight and drag. According to an exemplary embodiment, for a gasoline ICE tow vehicle 100, the control logic may be responsive to one or more of the following: the available SOC of the battery 108 of the e-trailer 102, an exhaust temperature, an engine speed and load, and a coolant, oil, and/or fuel temperature. According to an exemplary embodiment, for a diesel ICE tow vehicle 100, the control logic may be responsive to one or more of the following: the available SOC of the battery 108 of the e-trailer 102, an engine operating mode (e.g., catalyst light-off, normal, regen, etc.), an exhaust temperature, an engine speed and load, and a coolant, oil, and/or fuel temperature.

According to an exemplary embodiment, the source of the available SOC of the battery 108 of the e-trailer 102 may be from an e-trailer 102 battery management system (BMS) and/or other suitable source. According to an exemplary embodiment, the BMS value may be reduced by a customer/user via an app, from an electronic control unit (ECU) of the e-trailer 102, and/or other suitable means, accounting for a desired SOC upon arrival.

According to an exemplary embodiment, the source of the e-trailer 102 estimated weight may be an estimation/calculation, a customer/user input (e.g., via an app), a measurement of the sensor 116, and/or via other suitable source.

According to an exemplary embodiment, the source of the e-trailer 102 estimated drag may be an estimation/calculation, a lookup table (ECU or cloud) based on customer/user input (e.g., via an app identifying the tow vehicle's 100 make and model and the e-trailer 102 model), a measurement of the sensor 116, and/or via other suitable source.

According to an exemplary embodiment, the source of the available SOC of the battery 104 of the tow vehicle 100 may be the e-trailer 102 BMS and/or other suitable source. According to an exemplary embodiment, the BMS value needed for climate control may be reduced based on, e.g., current vehicle settings and/or a weather app.

According to an exemplary embodiment, the source of the tow vehicle's 100 estimated weight may be an estimation/calculation, a customer/user input (e.g., via an app), a lookup table (ECU or cloud) based on customer/user input (e.g., via an app identifying the tow vehicle's 100 make and model), via a percentage of the e-trailer's 100 weight (e.g., based on communication from the e-trailer's 102 ECU) to account for tongue weight, and/or other suitable source.

According to an exemplary embodiment, the source of the tow vehicle's 100 estimated drag may be an estimation/calculation, a lookup table (ECU or cloud) based on customer/user input (e.g., via an app identifying the tow vehicle's 100 make and model and the e-trailer's 102 model), and/or other suitable source.

According to an exemplary embodiment, the source of gasoline and/or diesel ICE parameters may be from ECU (e.g., via physical connection or wireless connection) and/or other suitable source.

According to an exemplary embodiment, the source of the tow vehicle's 100 rear height may be a measurement of the sensor 116 (e.g., a ride height sensor) and/or other suitable source.

According to an exemplary embodiment, the source of the e-trailer 102 hitch force may be a measurement of the sensor 116 (e.g., a force sensor or strain gage located between the tow vehicle 100 and the e-trailer 102) and/or other suitable source.

It may first be imperative to recognize what type of vehicle is being used as the tow vehicle 100. This may be accomplished using any number of methods. According to an exemplary embodiment, determining the type of vehicle being used as the tow vehicle 100 may comprise recognizing one or more signals from the tow vehicle 100. For example, there may be a flag in the powertrain control module (PCM) of the tow vehicle 100 indicating the vehicle type. This signal may be received in the e-trailer 102. According to an exemplary embodiment, signals from the tow vehicle 100 may be received in the e-trailer 102 and the type of vehicle that is towing the e-trailer 102 may be inferred as follows: determining whether the tow vehicle 100 has an ICE; and determining whether the tow vehicle 100 uses electrified propulsion.

According to an exemplary embodiment, signals indicating an ICE engine is present may comprise signals indicating a fuel tank level, an engine rpm reading, a fuel injection quantity, a catalyst temperature, and/or other suitable signals.

According to an exemplary embodiment, signals indicating that an ICE engine is a diesel engine may comprise signals indicating a urea injection quantity, a flag for a diesel particulate filter (DPF) filter regen, and/or other suitable signals. According to an exemplary embodiment, signals indicating that the ICE engine is not a diesel engine may comprise signals indicating a spark timing, which should not exist for a diesel engine, and/or other suitable signals.

According to an exemplary embodiment, signals indicating that the tow vehicle 100 has electrified propulsion may comprise signals indicating a motor rpm, a battery voltage being above a threshold, a motor temperature, a current, and/or other suitable signals.

According to an exemplary embodiment, when electrified propulsion signals are present and ICE signals are not present, it may be determined that the tow vehicle 100 is an EV. According to an exemplary embodiment, when electrified propulsion signals are present and ICE signals are also present, it may be determined that the tow vehicle 100 is an HEV. According to an exemplary embodiment, when electrified propulsion signals are not present and ICE signals are present, it may be determined that the tow vehicle 100 is an ICE-powered vehicle.

Figure 2:
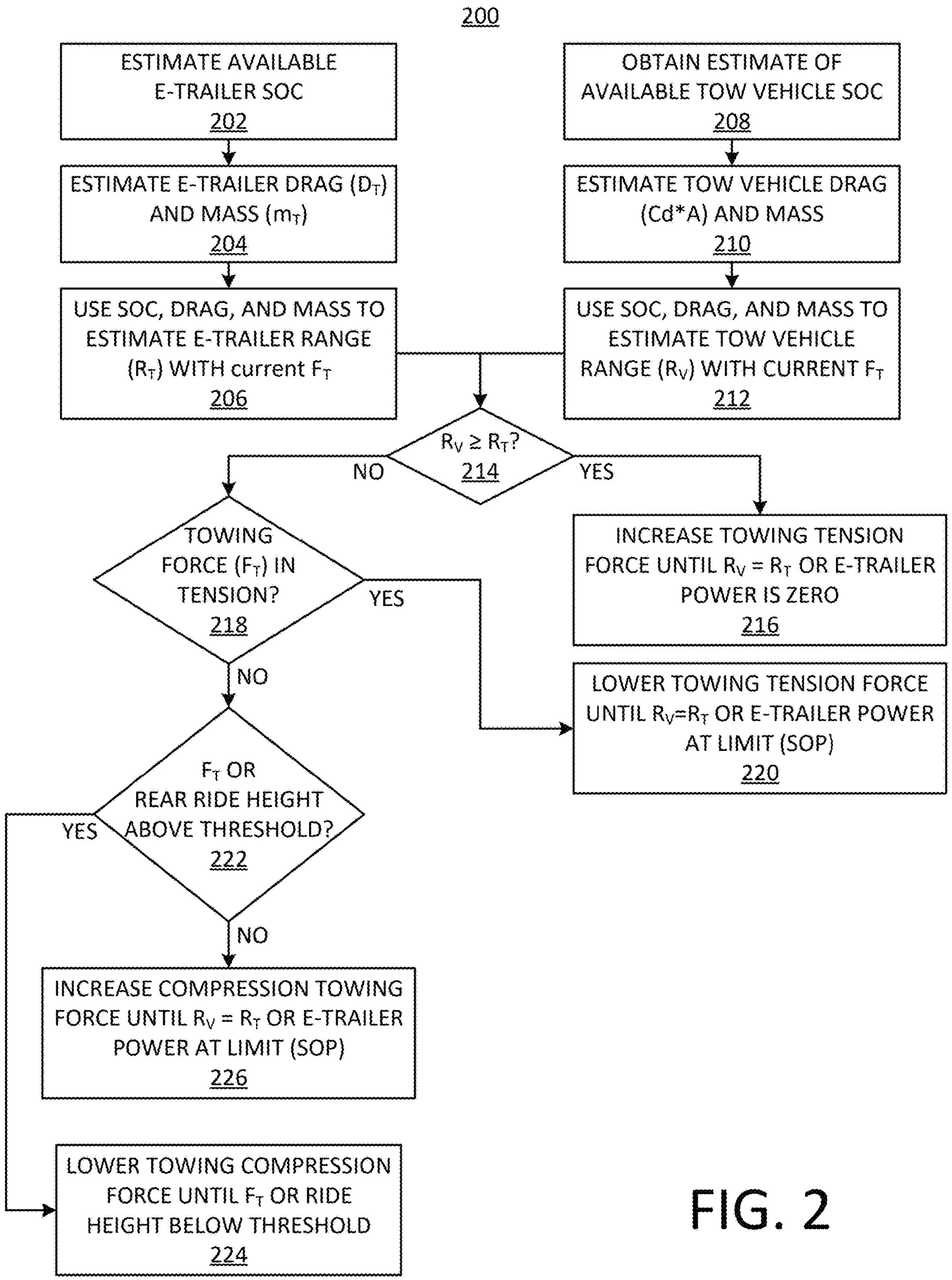
FIG. 2 illustrates a flowchart of a control logic method for towing an e-trailer with an EV tow vehicle, in accordance with an exemplary embodiment of the present disclosure.

Referring now to FIG. 2, a flowchart of a control logic method 200 for towing an e-trailer with an EV tow vehicle is illustratively depicted, in accordance with an exemplary embodiment of the present disclosure.

According to an exemplary embodiment, the control logic may be configured to determine an amount of power and/or torque to provide via the e-trailer motor. According to an exemplary embodiment, the towing force ($F_T$) may be set to an initial value.

According to an exemplary embodiment, when the tow vehicle is an EV, the control logic may be responsive to at least one of the following: an available e-trailer battery SOC, an e-railer estimated range ($R_T$), an available tow vehicle battery SOC, a tow vehicle estimated range ($R_V$), a measured towing force ($F_T$), whether the towing force is in tension or compression, the tow vehicle rear ride height, and the tow vehicle battery state of power (SOP) setting the maximum power.

According to an exemplary embodiment, the available e-trailer SOC may be based on both the e-trailer battery SOC and the desired or requested SOC left on the e-trailer battery once a destination is reached. The available tow vehicle SOC may be based on both the tow vehicle battery SOC and the tow vehicle battery SOC required to provide adequate climate control based on the weather.

At 202, the e-trailer available SOC may be estimated and, at 204, the e-trailer drag ($D_T$) and mass ($m_T$) may be estimated. At 206, using the e-trailer available SOC, the drag ($D_T$), and the mass ($m_T$), the e-trailer range ($R_T$) may be estimated with the current towing force ($F_T$).

At 208, an estimate of the available SOC of the tow vehicle may be determined and, at 210, the tow vehicle drag (Cd*A) and mass may be estimated. At 212, using the available SOC of the tow vehicle and the tow vehicle drag and mass, the tow vehicle range ($R_V$) may be estimated with the current towing force ($F_T$).

It may then be determined, at 214, whether the tow vehicle estimated range ($R_V$) is greater than or equal to the e-trailer range ($R_T$).

When the tow vehicle estimated range ($R_V$) is greater than or equal to the e-trailer range ($R_T$), then, at 216, the towing tension force may be increased until the tow vehicle estimated range ($R_V$) is equal to the e-trailer range ($R_T$) or the e-trailer's power is zero.

When the tow vehicle estimated range ($R_V$) is not greater than or equal to the e-trailer range ($R_T$), then, at 218, it may be determined whether the towing force ($F_T$) is in tension.

When the towing force ($F_T$) is in tension, then, at 220, the towing tension force may be lowered until the tow vehicle estimated range ($R_V$) is equal to the e-trailer range ($R_T$) or the e-trailer's power is at the limit according to the tow vehicle battery SOP.

When the towing force ($F_T$) is not in tension, then, at 222, it may be determined whether the towing force ($F_T$) or the rear ride height is above a threshold.

When the towing force ($F_T$) or the rear ride height is above a threshold, then, at 224, the towing compression force may be lowered until the towing force ($F_T$) or rear vehicle ride height is below the threshold.

When the towing force ($F_T$) or the rear ride height is not above a threshold, then, at 226, the towing compression force may be increased until the tow vehicle estimated range ($R_V$) is equal to the e-trailer range ($R_T$) or the e-trailer's power is at the limit according to the tow vehicle battery SOP.

Figure 3:
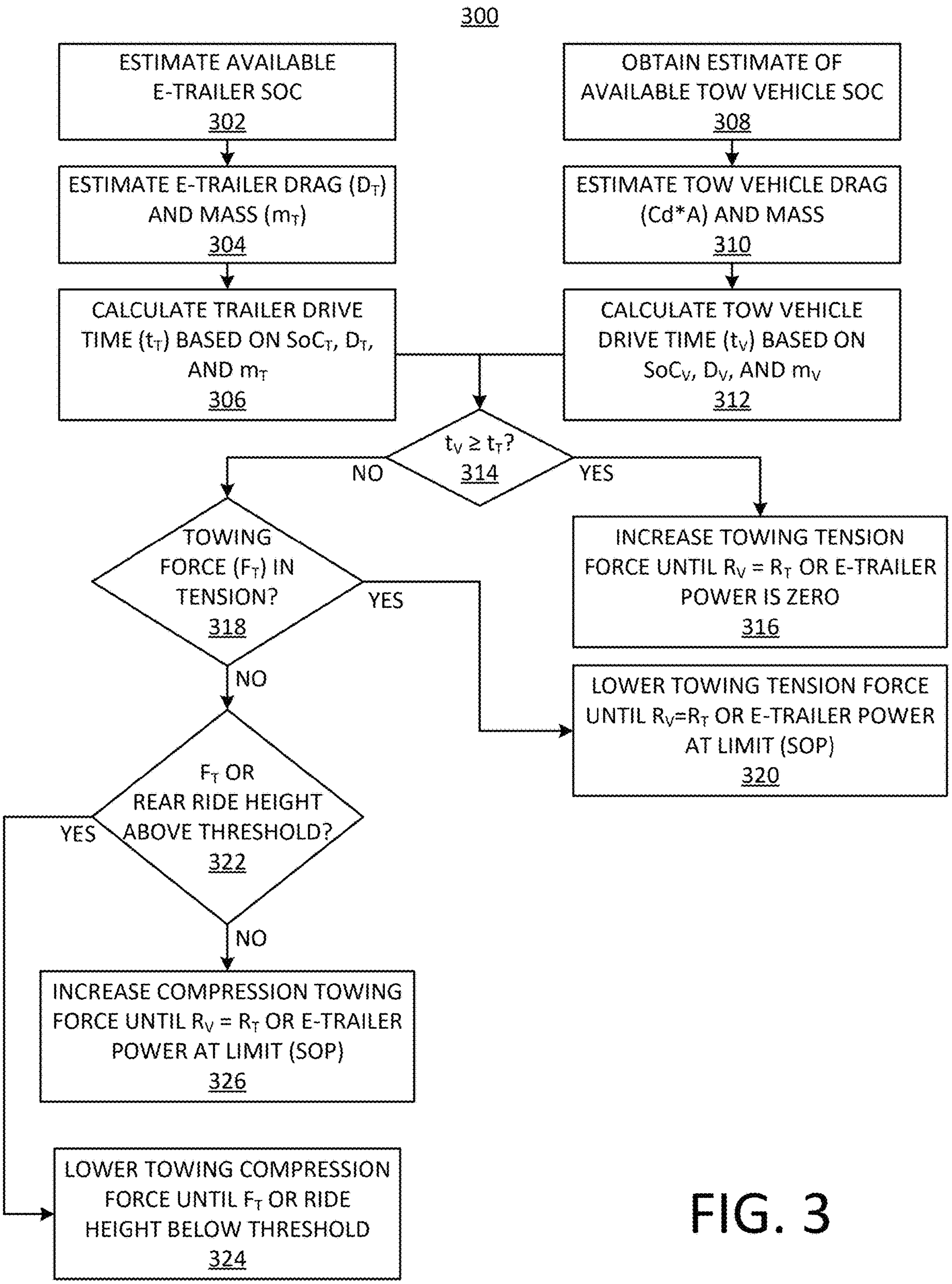
FIG. 3 illustrates a flowchart of a control logic method for towing an e-trailer with an EV tow vehicle, in accordance with an exemplary embodiment of the present disclosure.

Referring now to FIG. 3, a flowchart of a control logic method 300 for towing an e-trailer with an EV tow vehicle is illustratively depicted, in accordance with an exemplary embodiment of the present disclosure.

According to an exemplary embodiment, the control logic may be configured to determine an amount of power and/or torque to provide via the e-trailer motor.

According to an exemplary embodiment, when the tow vehicle is an EV, the control logic may be responsive to at least one of the following: an available e-trailer battery ($SoC_T$), an e-trailer estimated drag ($D_T$), an e-trailer estimated mass ($m_T$), an available tow vehicle battery ($SoC_V$), a tow vehicle estimated drag ($D_V$), a tow vehicle estimated mass ($m_V$), a measured towing force ($F_T$), whether towing force is in tension or compression, the tow vehicle rear ride height, and the tow vehicle battery SOP setting the maximum power.

According to an exemplary embodiment, the available e-trailer SOC may be based on both the e-trailer battery SOC and the desired or requested SOC left on the e-trailer battery once a destination is reached. The available tow vehicle SOC may be based on both the tow vehicle battery SOC and the tow vehicle battery SOC required to provide adequate climate control based on the weather.

At 302, the e-trailer available SOC may be estimated and, at 304, the e-trailer drag ($D_T$) and mass ($m_T$) may be estimated. At 306, the e-trailer drive time ($t_T$) may be calculated, based on the available e-trailer battery ($SoC_T$), the e-trailer estimated drag ($D_T$), and the e-trailer estimated mass ($m_T$), in accordance with Equation 1, where $C_0$, $C_1$, and $C_2$ are constants.

$$t_T = \frac{SoC_T - C_0 m_T}{C_1 m_T V + C_2 D_T V^3 + F_T V} \qquad \text{Equation 1}$$

At 308, an estimate of the available SOC of the tow vehicle may be determined and, at 310, the tow vehicle drag (Cd*A) and mass may be estimated. At 312, the tow vehicle drive time ($t_V$) may be calculated, based on the available tow vehicle battery ($SoC_V$), the tow vehicle estimated drag ($D_V$), and the tow vehicle estimated mass ($m_V$), in accordance with Equation 2, where $C_0$, $C_1$, and $C_2$ are constants.

$$t_V = \frac{SoC_V - C_0 m_V}{C_1 m_V V + C_2 D_V V^3 + F_T V} \qquad \text{Equation 2}$$

It may then be determined, at 314, whether the tow vehicle drive time ($t_V$) is greater than or equal to the e-trailer drive time ($t_T$).

When the tow vehicle drive time ($t_V$) is greater than or equal to the e-trailer drive time ($t_T$), then, at 316, the towing tension force may be increased until the tow vehicle estimated range ($R_V$) is equal to the e-trailer range ($R_T$) or the e-trailer's power is zero.

When the tow vehicle drive time ($t_V$) is not greater than or equal to the e-trailer drive time ($t_T$), then, at 318, it may be determined whether the towing force ($F_T$) is in tension.

When the towing force ($F_T$) is in tension, then, at 320, the towing tension force may be lowered until the tow vehicle estimated range ($R_V$) is equal to the e-trailer range ($R_T$) or the e-trailer's power is at the limit according to the tow vehicle battery SOP.

When the towing force ($F_T$) is not in tension, then, at 322, it may be determined whether the towing force ($F_T$) or the rear ride height is above a threshold.

When the towing force ($F_T$) or the rear ride height is above a threshold, then, at 324, the towing compression force may be lowered until the towing force ($F_T$) or rear vehicle ride height is below the threshold.

When the towing force ($F_T$) or the rear ride height is not above a threshold, then, at 326, the towing compression force may be increased until the tow vehicle estimated range ($R_V$) is equal to the e-trailer range ($R_T$) or the e-trailer's power is at the limit according to the tow vehicle battery SOP.

Figure 4:
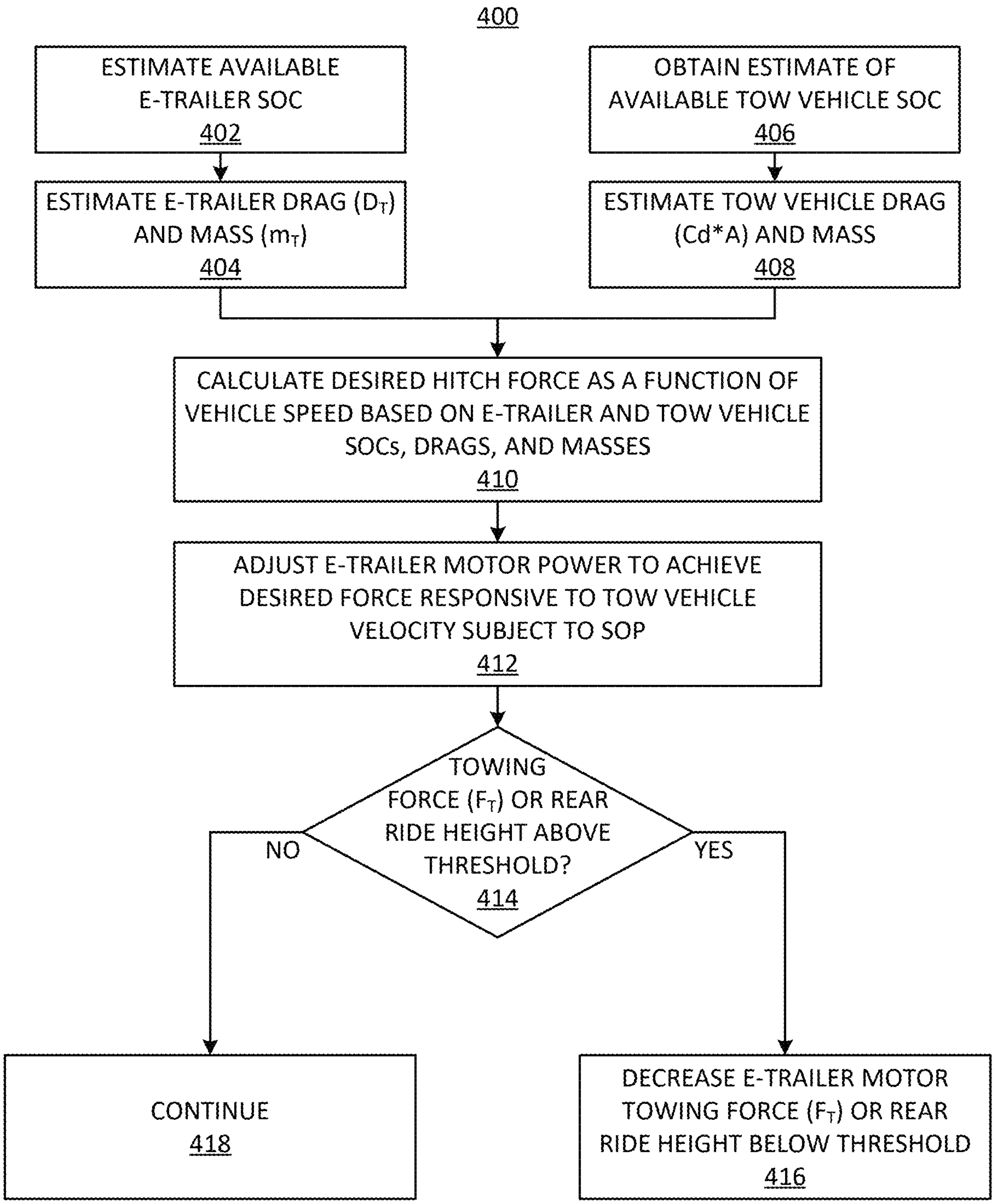
FIG. 4 illustrates a flowchart of a control logic method for towing an e-trailer with an EV tow vehicle, in accordance with an exemplary embodiment of the present disclosure.

Referring now to FIG. 4, a flowchart of a control logic method 400 for towing an e-trailer with an EV tow vehicle is illustratively depicted, in accordance with an exemplary embodiment of the present disclosure.

According to an exemplary embodiment, the control logic may be configured to determine an amount of power and/or torque to provide via the e-trailer motor. According to an exemplary embodiment, the towing force ($F_T$) may be set to an initial value.

According to an exemplary embodiment, when the tow vehicle is an EV, the control logic may be responsive to at least one of the following: an available e-trailer battery ($SoC_T$), an e-trailer estimated drag ($D_T$), an e-trailer estimated mass ($m_T$), an available tow vehicle battery ($SoC_V$), a tow vehicle estimated drag ($D_V$), a tow vehicle estimated drag ($m_V$), a tow vehicle rear ride height, a measured towing force ($F_T$), and the tow vehicle battery state of power (SOP) setting the maximum power.

According to an exemplary embodiment, periodically, the desired towing force may be calculated as a function of vehicle speed based on the above information. The force may be controlled to the desired value by adjusting the trailer motor power (more power=less tension or more compression).

According to an exemplary embodiment, the available e-trailer SOC may be based on both the e-trailer battery SOC and the desired or requested SOC left on the e-trailer battery once a destination is reached. The available tow vehicle SOC may be based on both the tow vehicle battery SOC and the tow vehicle battery SOC required to provide adequate climate control based on the weather.

At 402, the e-trailer available SOC may be estimated and, at 404, the e-trailer drag ($D_T$) and mass ($m_T$) may be estimated.

At 406, an estimate of the available SOC of the tow vehicle may be determined and, at 408, the tow vehicle drag (Cd*A) and mass may be estimated.

At 410, a desired hitch force may be calculated as a function of tow vehicle speed, based on the e-trailer and tow vehicle SOCs, drags, and masses. At 412, the e-trailer motor power may be adjusted to achieve a desired force responsive to the tow vehicle velocity (V) subject to the SOP.

At 414, it may be determined whether the towing force ($F_T$) or rear ride height is above a threshold.

When the towing force ($F_T$) or rear ride height is above the threshold, then, at 416, the e-trailer motor towing force ($F_T$) or the rear ride height are below the threshold. When the towing force ($F_T$) or rear ride height is not above the threshold, then, at 418, the tow vehicle and e-trailer may continue as they are.

Figure 5:
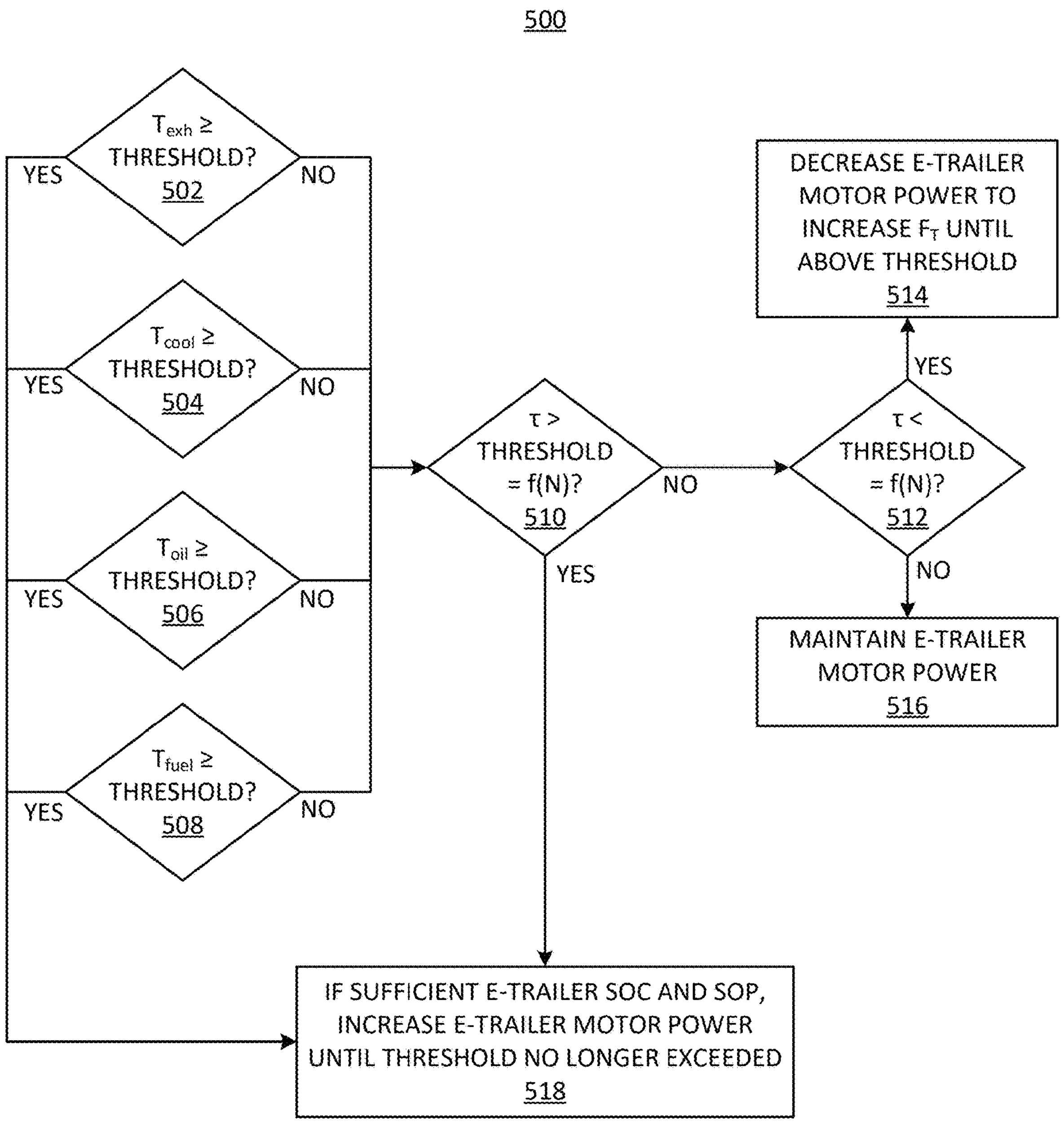
FIG. 5 illustrates a flowchart of a control logic method for towing an e-trailer with an ICE/HEV tow vehicle, in accordance with an exemplary embodiment of the present disclosure.

Referring now to FIG. 5, a flowchart of a control logic method 500 for towing an e-trailer with an ICE/HEV tow vehicle is illustratively depicted, in accordance with an exemplary embodiment of the present disclosure.

According to an exemplary embodiment, the control logic may be configured to determine an amount of power and/or torque to provide via the e-trailer motor. According to an exemplary embodiment, the tow vehicle may be started with a base towing force ($F_T$) target.

According to an exemplary embodiment, when the tow vehicle is a gasoline ICE/HEV, the control logic may be responsive to at least one of the following: an e-trailer battery SOC, an engine speed (N) and torque ($\tau$), an exhaust temperature ($T_{exh}$), a coolant temperature ($T_{cool}$), an oil temperature ($T_{oil}$), a fuel temperature ($T_{fuel}$), a transmission oil temperature, a transmission clutch temperature, and the tow vehicle battery SOP setting the maximum power.

According to an exemplary embodiment, at 502, it may be determined whether an exhaust temperature ($T_{exh}$) is greater than or equal to a threshold. At 504, it may be determined whether a coolant temperature ($T_{cool}$) is greater than or equal to a threshold. At 506, it may be determined whether an oil temperature ($T_{oil}$) is greater than or equal to a threshold. At 508, it may be determined whether a fuel temperature ($T_{fuel}$) is greater than or equal to a threshold.

When the exhaust temperature ($T_{exh}$), the coolant temperature ($T_{cool}$), the oil temperature ($T_{oil}$), and/or the fuel temperature ($T_{fuel}$) are greater than or equal to the threshold, then, at 518, when there is a sufficient e-trailer SOC and SOP, then the e-trailer motor power may be increased until the threshold is no longer exceeded.

When the exhaust temperature ($T_{exh}$), the coolant temperature ($T_{cool}$), the oil temperature ($T_{oil}$), and/or the fuel temperature ($T_{fuel}$) are not greater than or equal to the threshold, then, at 510, it may be determined whether the torque ($\tau$) is greater than the threshold when the threshold equals f(N).

When the torque ($\tau$) is greater than the threshold when the threshold equals f(N), then, at 518, when there is a sufficient e-trailer SOC and SOP, then the e-trailer motor power may be increased until the threshold is no longer exceeded.

When the torque ($\tau$) is not greater than the threshold when the threshold equals f(N), then, at 512, it may be determined whether the torque ($\tau$) is less than the threshold when the threshold equals f(N).

When the torque ($\tau$) is less than the threshold when the threshold equals f(N), then, at 514, the e-trailer motor power may be decreased to increase the towing force ($F_T$) until the torque ($\tau$) is above the threshold.

When the torque ($\tau$) is not less than the threshold when the threshold equals f(N), then, at 516, the e-trailer motor power may be maintained.

Figure 6:
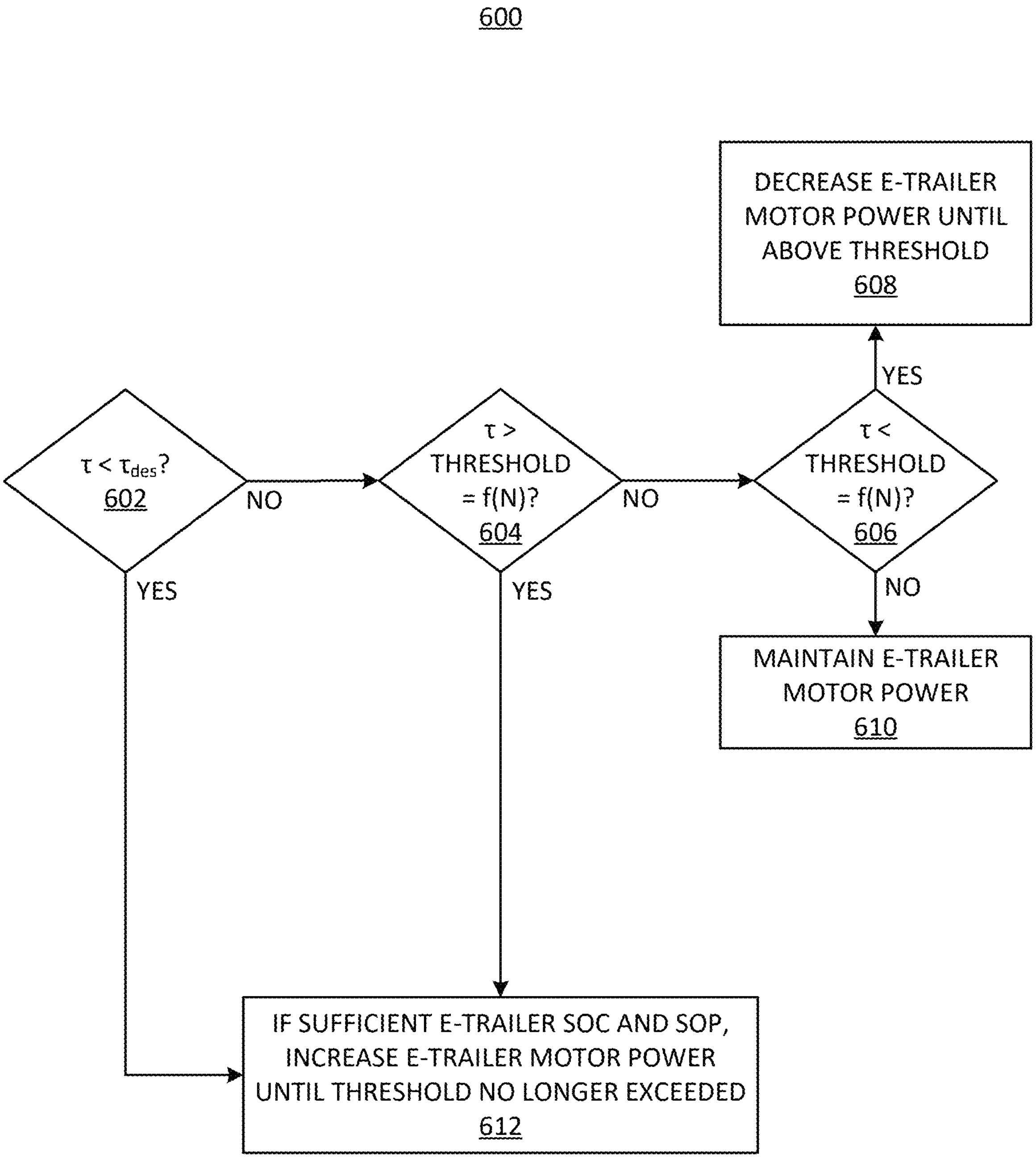
FIG. 6 illustrates a flowchart of a control logic method for towing an e-trailer with an ICE/HEV tow vehicle, in accordance with an exemplary embodiment of the present disclosure.

Referring now to FIG. 6, a flowchart of a control logic method 600 for towing an e-trailer with an ICE/HEV tow vehicle is illustratively depicted, in accordance with an exemplary embodiment of the present disclosure.

According to an exemplary embodiment, the control logic may be configured to determine an amount of power and/or torque to provide via the e-trailer motor. According to an exemplary embodiment, the tow vehicle may be started with a base towing force ($F_T$) target.

According to an exemplary embodiment, an approach may be to assess whether the engine torque is lower than a desired torque ($\tau_{des}$) in lieu of or in addition to the assessment of: an exhaust temperature ($T_{exh}$), a coolant temperature ($T_{cool}$), an oil temperature ($T_{oil}$), a fuel temperature ($T_{fuel}$), a transmission oil temperature, and a transmission clutch temperature.

According to an exemplary embodiment, at 602, it may be determined whether the torque (τ) is less than the desired torque ($\tau_{des}$). When the torque (τ) is less than the desired torque ($\tau_{des}$), then, at 612, when there is a sufficient e-trailer SOC and SOP, then the e-trailer motor power may be increased until the threshold is no longer exceeded.

When the torque (τ) is not less than the desired torque ($\tau_{des}$), then, at 604, it may be determined whether the torque (τ) is greater than the threshold when the threshold equals f(N).

When the torque (τ) is greater than the threshold when the threshold equals f(N), then, at 612, when there is a sufficient e-trailer SOC and SOP, then the e-trailer motor power may be increased until the threshold is no longer exceeded.

When the torque (τ) is not greater than the threshold when the threshold equals f(N), then, at 606, it may be determined whether the torque (τ) is less than the threshold when the threshold equals f(N).

When the torque (τ) is less than the threshold when the threshold equals f(N), then, at 608, the e-trailer motor power may be decreased until the torque (τ) is above the threshold.

When the torque (τ) is not less than the threshold when the threshold equals f(N), then, at 610, the e-trailer motor power may be maintained.

Figure 7:
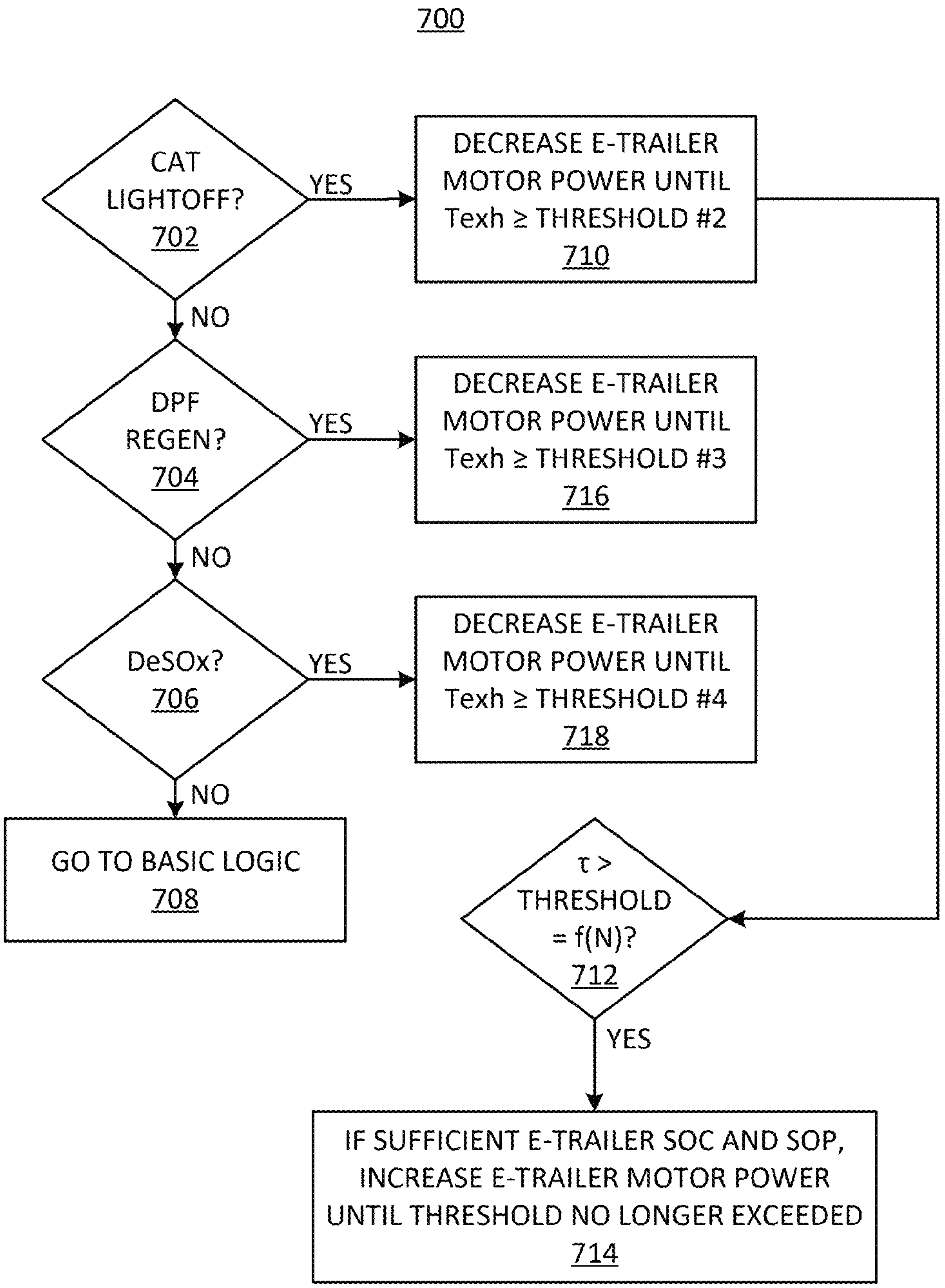
FIG. 7 illustrates a flowchart of a control logic method for towing an e-trailer with an ICE/HEV tow vehicle, in accordance with an exemplary embodiment of the present disclosure.

Referring now to FIG. 7, a flowchart of a control logic method 700 for towing an e-trailer with an ICE/HEV tow vehicle is illustratively depicted, in accordance with an exemplary embodiment of the present disclosure.

According to an exemplary embodiment, the control logic may be configured to determine an amount of power and/or torque to provide via the e-trailer motor. According to an exemplary embodiment, the tow vehicle may be started with a base towing force ($F_T$) target.

According to an exemplary embodiment, when the tow vehicle is a diesel ICE/HEV, the control logic may be responsive to at least one of the following: an e-trailer battery SOC, an engine speed (N) and torque (τ), a desired torque ($\tau_{des}$), an exhaust temperature ($T_{exh}$), a coolant temperature ($T_{cool}$), an oil temperature ($T_{oil}$), a fuel temperature ($T_{fuel}$), a transmission oil temperature, a transmission clutch temperature, and an engine operating mode (EOM).

According to an exemplary embodiment, control logic method 700 is similar to that of control logic 500 for a gasoline tow vehicle, with additional features for actions taken during specific engine operating modes, such as a catalyst lightoff, diesel particulate filter (DPF) Regeneration, and a DeSOx. According to an exemplary embodiment, e-trailer regenerative braking may be added to increase the exhaust temperature ($T_{exh}$) for these special cases.

At 702, it may be determined whether the catalyst lightoff is present. When the catalyst lightoff is present, then, at 710, the e-trailer motor power may be decreased until the exhaust temperature ($T_{exh}$) is greater than or equal to a second threshold. Then, at 712, it may be determined whether the threshold (τ) is greater than a threshold when the threshold equals f(N). When the threshold (τ) is greater than a threshold when the threshold equals f(N), then, at 714, when there is a sufficient e-trailer SOC and SOP, then the e-trailer motor power may be increased until the threshold is no longer exceeded.

When the catalyst lightoff is not present, then, at 704, it may be determined whether DPF regeneration is present. When DPF regeneration is present, then, at 716, the e-trailer motor power may be decreased until the exhaust temperature ($T_{exh}$) is greater than or equal to a third threshold. The third threshold may be greater than the second threshold.

When DPF regeneration is not present, then, at 704, it may be determined whether DeSOx was identified. When DeSOx has not been identified, then, at 718, the e-trailer motor power may be decreased until the exhaust temperature ($T_{exh}$) is greater than or equal to a fourth threshold. The fourth threshold may be greater than the third threshold.

Figure 8:
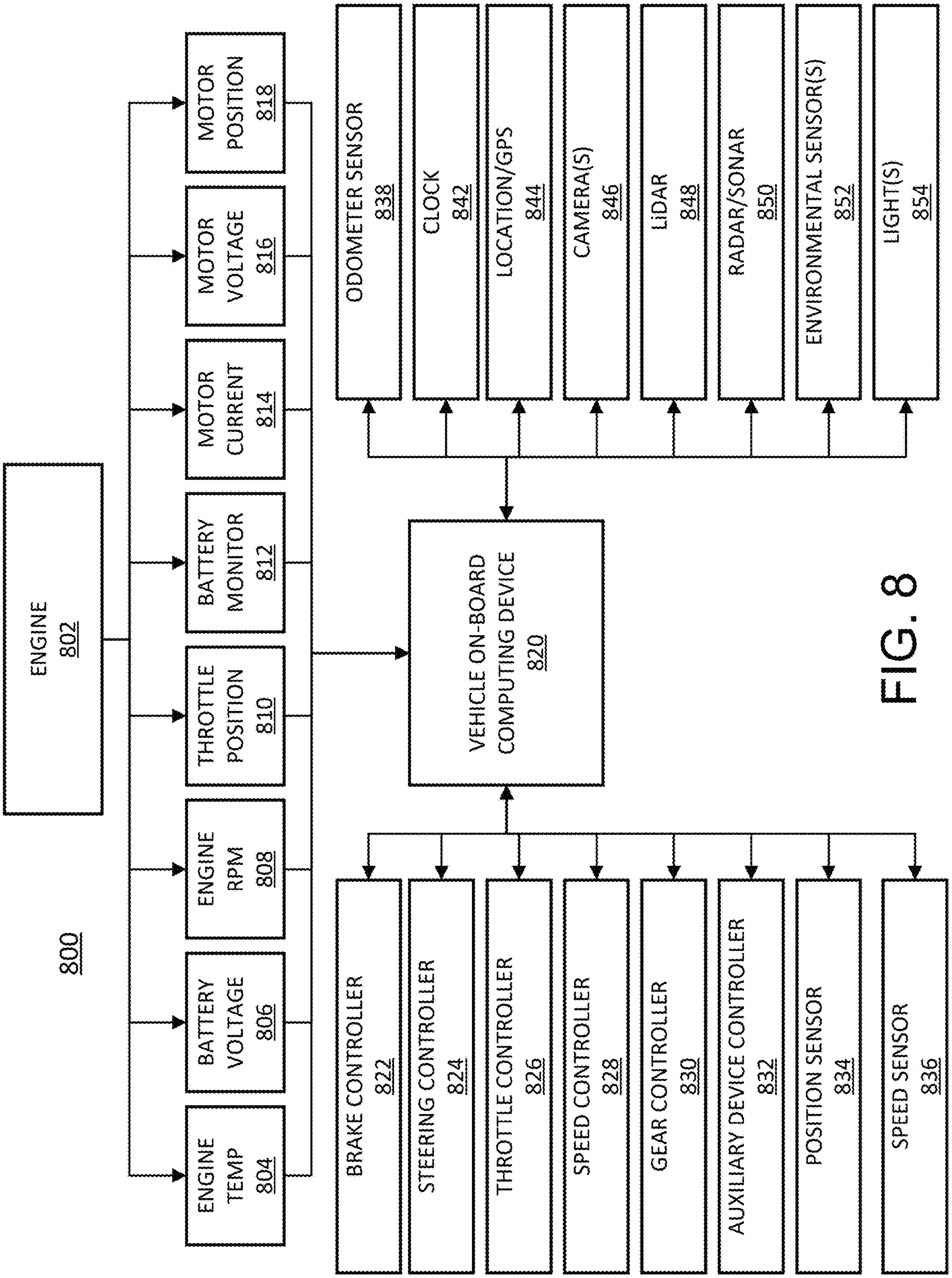
FIG. 8 illustrates an example architecture of a vehicle, according to an exemplary embodiment of the present disclosure.

Referring now to FIG. 8, an example vehicle system architecture 800 for a vehicle is provided, in accordance with an exemplary embodiment of the present disclosure. The following discussion of vehicle system architecture 800 is sufficient for understanding one or more components of tow vehicle 100.

As shown in FIG. 8, the vehicle system architecture 800 may comprise an engine, motor or propulsive device 802 and various sensors 804-818 for measuring various parameters of the vehicle system architecture 800. In gas-powered or hybrid vehicles having a fuel-powered engine, the sensors 804-818 may comprise, for example, an engine temperature sensor 804, a battery voltage sensor 806, an engine Rotations Per Minute (RPM) sensor 808, and/or a throttle position sensor 810. If the vehicle is an electric or hybrid vehicle, then the vehicle may comprise an electric motor, and accordingly may comprise sensors such as a battery monitoring system 812 (to measure current, voltage and/or temperature of the battery), motor current 814 and voltage 816 sensors, and motor position sensors such as resolvers and encoders 818.

Operational parameter sensors that are common to both types of vehicles may comprise, for example: a position sensor 834 such as an accelerometer, gyroscope and/or inertial measurement unit; a speed sensor 836; and/or an odometer sensor 838. The vehicle system architecture 800 also may comprise a clock 842 that the system uses to determine vehicle time and/or date during operation. The clock 842 may be encoded into the vehicle on-board computing device 820, it may be a separate device, or multiple clocks may be available.

The vehicle system architecture 800 may comprise various sensors that operate to gather information about the environment in which the vehicle is traveling. These sensors may comprise, for example: a location sensor 844 (for example, a Global Positioning System (GPS) device); object detection sensors such as one or more cameras 846; a LiDAR sensor system 848; and/or a radar and/or a sonar system 850. The sensors may comprise environmental sensors 852 such as, e.g., a humidity sensor, a precipitation sensor, a light sensor, and/or ambient temperature sensor. The object detection sensors may be configured to enable the vehicle system architecture 800 to detect objects that are within a given distance range of the vehicle in any direction, while the environmental sensors 852 may be configured to collect data about environmental conditions within the vehicle's area of travel. According to an exemplary embodiment, the vehicle system architecture 700 may comprise one or more lights 854 (e.g., headlights, flood lights, flashlights, etc.).

During operations, information may be communicated from the sensors to an on-board computing device 820 (e.g., tow vehicle controller 114, trailer controller 118, and computing device 900). The on-board computing device 820 may be configured to analyze the data captured by the sensors and/or data received from data providers and may be configured to optionally control operations of the vehicle system architecture 800 based on results of the analysis. For example, the on-board computing device 820 may be configured to control: braking via a brake controller 822; direction via a steering controller 824; speed and acceleration via a throttle controller 826 (in a gas-powered vehicle) or a motor speed controller 828 (such as a current level controller in an electric vehicle); a differential gear controller 830 (in vehicles with transmissions); and/or other controllers. The brake controller 822 may comprise a pedal effort sensor, pedal effort sensor, and/or simulator temperature sensor, as described herein.

Geographic location information may be communicated from the location sensor 844 to the on-board computing device 820, which may then access a map of the environment that corresponds to the location information to determine known fixed features of the environment such as streets, buildings, stop signs and/or stop/go signals. Captured images from the cameras 846 and/or object detection information captured from sensors such as LiDAR 848 may be communicated from those sensors to the on-board computing device 820. The object detection information and/or captured images may be processed by the on-board computing device 820 to detect objects in proximity to the vehicle. Any known or to be known technique for making an object detection based on sensor data and/or captured images may be used in the embodiments disclosed in this document.

Figure 9:
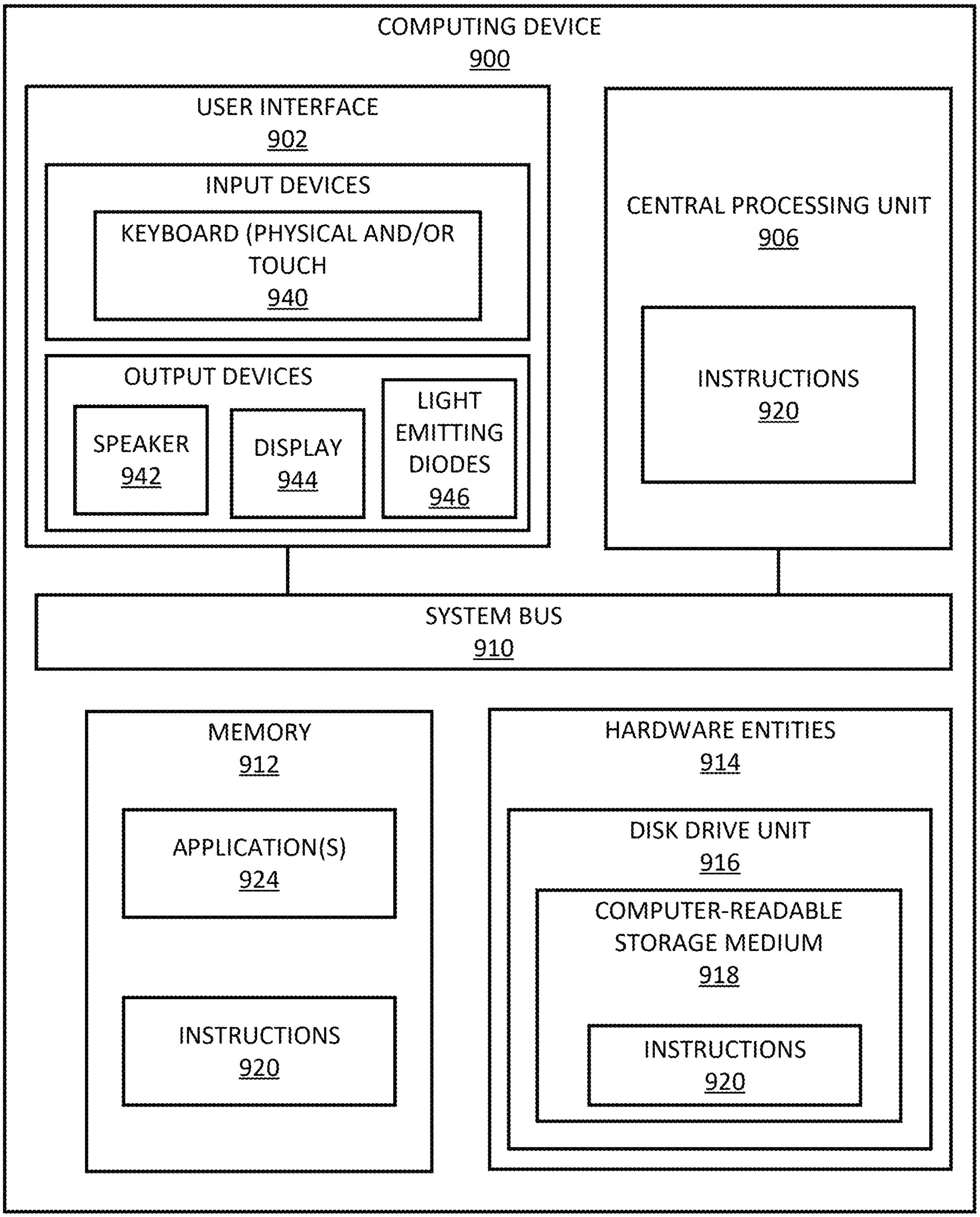
FIG. 9 illustrates example elements of a computing device, according to an exemplary embodiment of the present disclosure.

Referring now to FIG. 9, an illustration of an example architecture for a computing device 900 is provided. According to an exemplary embodiment, one or more functions of the present disclosure may be implemented by a computing device such as, e.g., computing device 900 or a computing device similar to computing device 900. Computing device 900 may be a quantum computer, a classical computer, and/or have one or more components configured to perform one or more quantum and/or classical computing functions. Tow vehicle controller 114, trailer controller 118, and/or computing device 820 may be an example of computing device 900 and/or may comprise one or more components of computing device 900.

The hardware architecture of FIG. 9 represents one example implementation of a representative computing device configured to implement at least a portion of the systems/devices (e.g., tow vehicle 100, e-trailer 102) and method(s)/control logic(s) (e.g., control logic method 200, control logic method 300, control logic method 400, control logic method 500, control logic method 600, and control logic method 700) described herein.

Some or all components of the computing device 900 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 9, the computing device 900 may comprise a user interface 902 (e.g., a graphical user interface), a Central Processing Unit ("CPU") 906, a system bus 910, a memory 912 connected to and accessible by other portions of computing device 900 through system bus 910, and hardware entities 914 connected to system bus 910. The user interface may comprise input devices and output devices, which may be configured to facilitate user-software interactions for controlling operations of the computing device 900. The input devices may comprise, but are not limited to, a physical and/or touch keyboard 940. The input devices may be connected to the computing device 900 via a wired or wireless connection (e.g., a Bluetooth® connection). The output devices may comprise, but are not limited to, a speaker 942, a display 944, and/or light emitting diodes 946.

At least some of the hardware entities 914 may be configured to perform actions involving access to and use of memory 912, which may be a Random Access Memory (RAM), a disk driver and/or a Compact Disc Read Only Memory (CD-ROM), among other suitable memory types. Hardware entities 914 may comprise a disk drive unit 916 comprising a computer-readable storage medium 918 on which may be stored one or more sets of instructions 920 (e.g., programming instructions such as, but not limited to, software code) configured to implement one or more of the methodologies, procedures, or functions described herein. The instructions 920 may also reside, completely or at least partially, within the memory 912 and/or within the CPU 906 during execution thereof by the computing device 900.

The memory 912 and the CPU 906 may also constitute machine-readable media. The term "machine-readable media", as used here, refers to a single medium or multiple media (e.g., a centralized or distributed database, and/or associated caches and servers) that store the one or more sets of instructions 920. The term "machine-readable media", as used here, also refers to any medium that is capable of storing, encoding, or carrying a set of instructions 920 for execution by the computing device 900 and that cause the computing device 900 to perform any one or more of the methodologies of the present disclosure. According to various embodiments, one or more computer applications 924 may be stored on the memory 912.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A system for coordinating propulsion of an e-trailer, comprising:
- the e-trailer, comprising:
  - a battery;
  - a motor configured to propel the e-trailer; and
  - a trailer controller comprising:
    - a processor; and
    - a memory;
  - a tow vehicle coupled to the e-trailer and configured to pull the e-trailer; and
  - a sensor configured to determine one or more of:
  - a force exerted from the tow vehicle to the e-trailer; and
  - a force exerted from the e-trailer to the tow vehicle,
- wherein the trailer controller is configured to:
  - determine one or more data points associated with the e-trailer and the tow vehicle, and
  - adjust a propulsion of the e-trailer, using the motor, based on the one or more data points;
  - wherein the one or more data points comprise a vehicle type of the tow vehicle.

2. The system of claim 1, wherein the vehicle type comprises one of the following:
- an electric vehicle (EV) comprising a battery;
- an internal combustion engine (ICE)-powered vehicle comprising an ICE; and
- a hybrid EV (HEV) comprising a battery and an ICE.

3. The system of claim 2, wherein:
- the vehicle type is an EV, and
- the one or more data points comprise one or more of the following:
  - a state of charge (SOC) of the battery of the EV;
  - an estimated electric range of the EV;
  - a total drag estimate of the EV;
  - a total drag estimate of the e-trailer;
  - a weight estimate of the EV;
  - a weight estimate of the e-trailer;
  - an SOC of the e-trailer; and
  - an estimated electric range of the e-trailer.

4. The system of claim 2, wherein:
- the vehicle type is an ICE-powered vehicle, and

- the one or more data points comprise one or more of the following:
- an exhaust temperature;
- an engine speed and load;
- a water temperature;
- an oil temperature;
- a fuel temperature;
- an engine operating mode;
- a total drag estimate of the ICE-powered vehicle;
- a total drag estimate of the e-trailer;
- a weight estimate of the ICE-powered vehicle;
- a weight estimate of the e-trailer;
- a state of charge (SOC) of the e-trailer; and
- an estimated electric range of the e-trailer.

5. The system of claim 2, wherein:
- the vehicle type is an HEV, and
- the one or more data points comprise one or more of the following:
- a state of charge (SOC) of the battery of the HEV;
- an estimated electric range of the HEV;
- an exhaust temperature;
- an engine speed and load;
- a water temperature;
- an oil temperature;
- a fuel temperature;
- an engine operating mode;
- a total drag estimate of the HEV;
- a total drag estimate of the e-trailer;
- a weight estimate of the HEV;
- a weight estimate of the e-trailer;
- an SOC of the e-trailer; and
- an estimated electric range of the e-trailer.

6. The system of claim 1, wherein the sensor is configured to record the one or more data points.

7. The system of claim 1, wherein the tow vehicle comprises a tow vehicle controller, comprising a processor and a memory.

8. The system of claim 7, wherein the tow vehicle controller is configured to send one or more signals comprising the one or more data points.

9. The system of claim 1, wherein the adjusting the propulsion of the e-trailer comprises one or more of the following:
- increasing or decreasing a towing tension force between the e-trailer and the tow vehicle;
- increasing or decreasing a compression towing force;
- increasing or decreasing a towing force; and
- increasing or decreasing e-trailer motor power.

10. A method for coordinating propulsion of an e-trailer, comprising:
- determining, using a sensor:
  - a force exerted from a tow vehicle to the e-trailer; and
  - a force exerted from the e-trailer to the tow vehicle,
- wherein:
  - the e-trailer comprises:
    - a battery;
    - a motor configured to propel the e-trailer; and
    - a trailer controller comprising:
      - a processor; and
      - a memory; and
  - the tow vehicle is coupled to the e-trailer and configured to pull the e-trailer;
- determining, using the trailer controller, one or more data points associated with the e-trailer and the tow vehicle; and adjusting, using the trailer controller, a propulsion of the e-trailer, using the motor, based on the one or more data points;

wherein the one or more data points comprise a vehicle type of the tow vehicle.

11. The method of claim 10, wherein the vehicle type comprises one of the following:

an electric vehicle (EV) comprising a battery;

an internal combustion engine (ICE)-powered vehicle comprising an ICE; and a hybrid EV (HEV) comprising a battery and an ICE.

12. The method of claim 11, wherein:

the vehicle type is an EV, and the one or more data points comprise one or more of the following:

a state of charge (SOC) of the battery of the EV;

an estimated electric range of the EV;

a total drag estimate of the EV;

a total drag estimate of the e-trailer;

a weight estimate of the EV;

a weight estimate of the e-trailer;

an SOC of the e-trailer; and an estimated electric range of the e-trailer.

13. The method of claim 11, wherein:

the vehicle type is an ICE-powered vehicle, and the one or more data points comprise one or more of the following:

an exhaust temperature;

an engine speed and load;

a water temperature;

an oil temperature;

a fuel temperature;

an engine operating mode;

a total drag estimate of the ICE-powered vehicle;

a total drag estimate of the e-trailer;

a weight estimate of the ICE-powered vehicle;

a weight estimate of the e-trailer;

a state of charge (SOC) of the e-trailer; and an estimated electric range of the e-trailer.

14. The method of claim 11, wherein:

the vehicle type is an HEV, and the one or more data points comprise one or more of the following:

a state of charge (SOC) of the battery of the HEV;

an estimated electric range of the HEV;

an exhaust temperature;

an engine speed and load;

a water temperature;

an oil temperature;

a fuel temperature;

an engine operating mode;

a total drag estimate of the HEV;

a total drag estimate of the e-trailer;

a weight estimate of the HEV;

a weight estimate of the e-trailer;

an SOC of the e-trailer; and an estimated electric range of the e-trailer.

15. The method of claim 10, further comprising recording, using the sensor, the one or more data points.

16. The method of claim 10, wherein the tow vehicle comprises a tow vehicle controller, comprising a processor and a memory.

17. The method of claim 16, further comprising sending, using the tow vehicle controller, one or more signals comprising the one or more data points.

18. The method of claim 10, wherein the adjusting the propulsion of the e-trailer comprises one or more of the following:

increasing or decreasing a towing tension force between the e-trailer and the tow vehicle;

increasing or decreasing a compression towing force;

increasing or decreasing a towing force; and increasing or decreasing e-trailer motor power.

* * * * *